United States Patent
Usmani et al.

(10) Patent No.: US 8,990,422 B1
(45) Date of Patent: Mar. 24, 2015

(54) TCP SEGMENTATION OFFLOAD (TSO) USING A HYBRID APPROACH OF MANIPULATING MEMORY POINTERS AND ACTUAL PACKET DATA

(75) Inventors: Ozair Usmani, San Jose, CA (US); Kaushik Kuila, San Jose, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 459 days.

(21) Appl. No.: 13/165,768

(22) Filed: Jun. 21, 2011

(51) Int. Cl.
*G06F 15/16* (2006.01)
*H04L 29/06* (2006.01)

(52) U.S. Cl.
CPC ........ *H04L 69/166* (2013.01); *H04L 29/06136* (2013.01)
USPC ........... 709/232; 709/226; 709/245; 709/246; 711/208

(58) Field of Classification Search
USPC ................... 709/226, 232, 245, 246; 711/208
See application file for complete search history.

(56) References Cited

U.S. PATENT DOCUMENTS

| | | | |
|---|---|---|---|
| 6,389,468 B1 * | 5/2002 | Muller et al. | 709/226 |
| 6,453,360 B1 * | 9/2002 | Muller et al. | 709/250 |
| 6,526,446 B1 * | 2/2003 | Yang et al. | 709/230 |
| 6,701,393 B1 * | 3/2004 | Kemeny et al. | 710/40 |
| 7,533,176 B2 * | 5/2009 | Freimuth et al. | 709/227 |
| 7,676,814 B2 * | 3/2010 | Karighattam et al. | 719/319 |
| 7,773,630 B2 * | 8/2010 | Huang et al. | 370/474 |
| 7,958,255 B1 * | 6/2011 | Karighattam et al. | 709/232 |
| 7,962,628 B2 * | 6/2011 | Freimuth et al. | 709/227 |
| 8,438,265 B2 * | 5/2013 | Biran et al. | 709/224 |
| 8,842,696 B1 * | 9/2014 | Usmani | 370/474 |
| 2002/0199005 A1 * | 12/2002 | Schneider et al. | 709/229 |
| 2009/0034549 A1 * | 2/2009 | Soni et al. | 370/412 |

* cited by examiner

*Primary Examiner* — Michael Y Won
(74) *Attorney, Agent, or Firm* — Sterne, Kessler, Goldstein & Fox PLLC

(57) ABSTRACT

Systems, apparatusses, and methods are disclosed for transmission control protocol (TCP) segmentation offload (TSO). A hardware TSO engine is capable of handling segmentation of data packets and consequent header field mutation of hundreds of flows simultaneously. The TSO engine generates data pointers in order to "cut up" the payload data of a data packet, thereby creating multiple TCP segments. Once the data of the data packet has been fetched, the TSO engine "packs" the potentially-scattered chunks of data into TCP segments, and recalculates each TCP segment's internet protocol (IP) length, IP identification (ID), IP checksum, TCP sequence number, and TCP checksum, as well as modifies the TCP flags. The TSO engine is able to rapidly switch contexts, and share the control logic amongst all flows.

41 Claims, 8 Drawing Sheets

| | | |
|---|---|---|
| DH+DP (combined)^i | 500 | A0 |
| DP0 | 500 | A1 |
| DH | 70 | A0 |
| DP1 | 930 | A1+500 |
| DH | 70 | A0 |
| DP2 | 570 | A1+1430 |

| Segment num | Address | Length | Comments |
|---|---|---|---|
| TCP0 | A0 | 70 | Header |
| | A0+70 | 430 | MSS payload |
| | A1 | 500 | |
| TCP1 | A0 | 70 | Header |
| | A1+500 | 930 | MSS payload |
| TCP2 | A0 | 70 | Header |
| | A1+1430 | 570 | Payload (not MSS) |

[i] The first descriptor is dealt with in a special way. Since header and start-of-payload of the first segment are in the same block of memory, the TSO engine optimizes performance by keeping them together in this pseudo descriptor.

TCP SEGMENTATION OFFLOAD (TSO) USING A HYBRID APPROACH OF MANIPULATING MEMORY POINTERS AND ACTUAL PACKET DATA

FIELD

The present disclosure relates to a scheme for a transmission control protocol (TCP) segmentation offload. In particular, it relates to a scheme for a TCP segmentation offload (TSO) using a hybrid approach of manipulating memory pointers and actual packet data.

BACKGROUND

When TCP was first developed, its development was based on the networking and processing capabilities that were currently available at that time. As such, the fundamental aspects of the operation of TCP was predicated on the existing networking and processing technologies. During this time, bandwidth was scarce and high cost, while processing resources by the host processors were considered to be essentially limitless. Over time, with the advent of the Gigabit Ethernet (GbE), bandwidth is no longer scare and expensive. However, the processing resources of the host processors are now regarded as being rather limited. Thus, there currently is a need to provide an efficient and low cost means for improving the current processing resources of the host processors.

When large transmission control protocol/internet protocol (TCP/IP) data packets are to be sent over a computer network, prior to their transmission, they are broken down into smaller segments that are able to pass through all of the network elements, such as routers and switches, that lie between the source computer and the destination computer(s). This process is referred to as segmentation. Segmentation is often performed by the host processor. Offloading this task of segmentation from the host processor will help to improve the processing resources of the host processor.

SUMMARY

The present disclosure teaches a low-cost hardware-based TSO engine, which is able to efficiently break large TCP/IP data packets into smaller-sized TCP data segments. The TSO engine breaks the large TCP/IP data packets into TCP segments that are a maximum segment size (MSS) or less. The MSS corresponds to the largest amount of payload data that can be encapsulated by a TCP header. As such, it is evident that by employing the disclosed hardware-based TSO engine into a computer system, there will be an improvement in the system's processing resources of the host processor.

The present disclosure relates to methods, systems, and apparatusses for a scheme for TCP segmentation offload (TSO) using a hybrid approach of manipulating memory pointers and actual packet data. In some embodiments, a method for TSO involves generating, by a processor, descriptors for a data packet to be segmented into two or more TCP segments. The method further involves sending, by the processor, the descriptors to a TSO engine. Also, the method involves reading, by the TSO engine, the descriptors. In addition, the method involves generating, by the TSO engine, pseudo descriptors according to the descriptors. Additionally, the method involves accessing memory according to the pseudo descriptors, by the TSO engine, to retrieve data related to the data packet. Further, the method involves building, by the TSO engine, the TCP segments according to the pseudo descriptors.

In one or more embodiments, a system for TSO involves a processor and a TSO engine. In at least one embodiment, the processor generates descriptors for a data packet to be segmented into two or more TCP segments, and sends the descriptors to a TSO engine. In at least one embodiment, the TSO engine reads the descriptors, generates pseudo descriptors according to the descriptors, accesses memory according to the pseudo descriptors to retrieve data related to the data packet, and builds the TCP segments according to the pseudo descriptors.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIGS. 6A, 6B, 6C, and 6D, when viewed together, illustrate the process of segmenting an exemplary data packet into multiple TCP segments that is performed by the disclosed TSO engine, in accordance with at least one embodiment of the present disclosure.

Figures 6A, 6B:
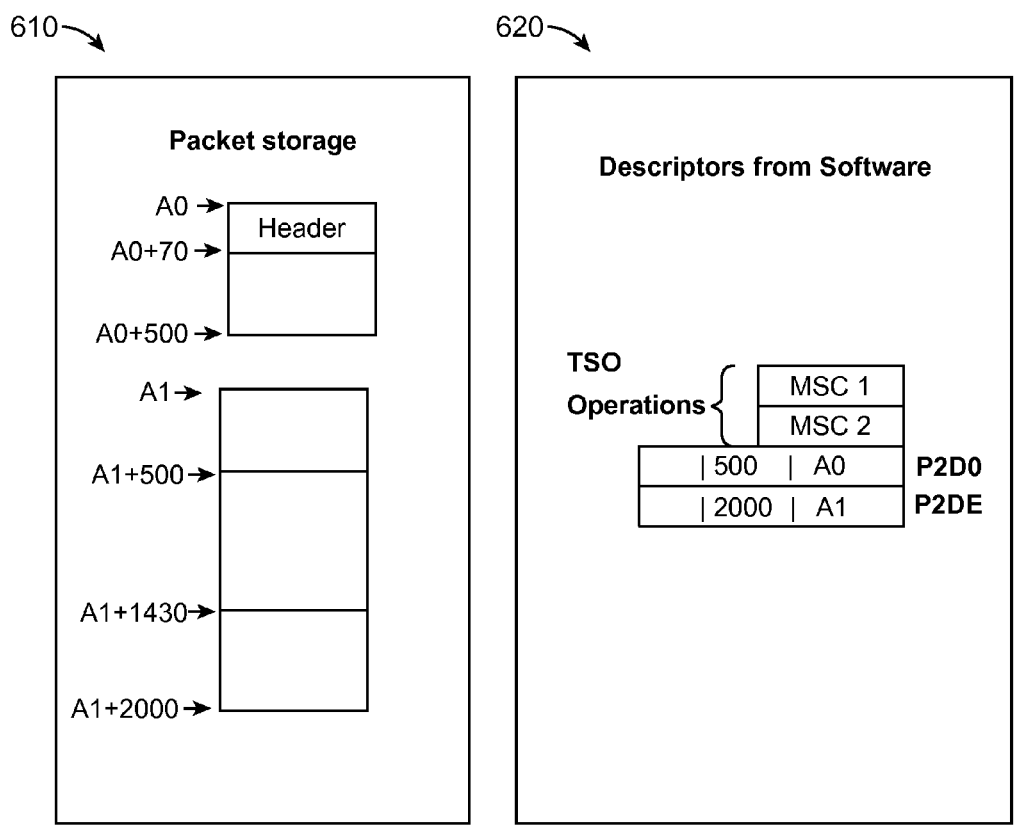

FIG. 6A shows sections of the exemplary data packet being stored in memory, in accordance with at least one embodiment of the present disclosure.

FIG. 6B shows the descriptors for the exemplary data packet that are generated by a processor, in accordance with at least one embodiment of the present disclosure.

FIG. 6C shows the pseudo descriptors that are generated by the TSO engine and are used to build the TCP segments, in accordance with at least one embodiment of the present disclosure.

FIG. 6D shows the TCP segments that are built by the TSO engine according to the pseudo descriptors, in accordance with at least one embodiment of the present disclosure.

Figure 7:
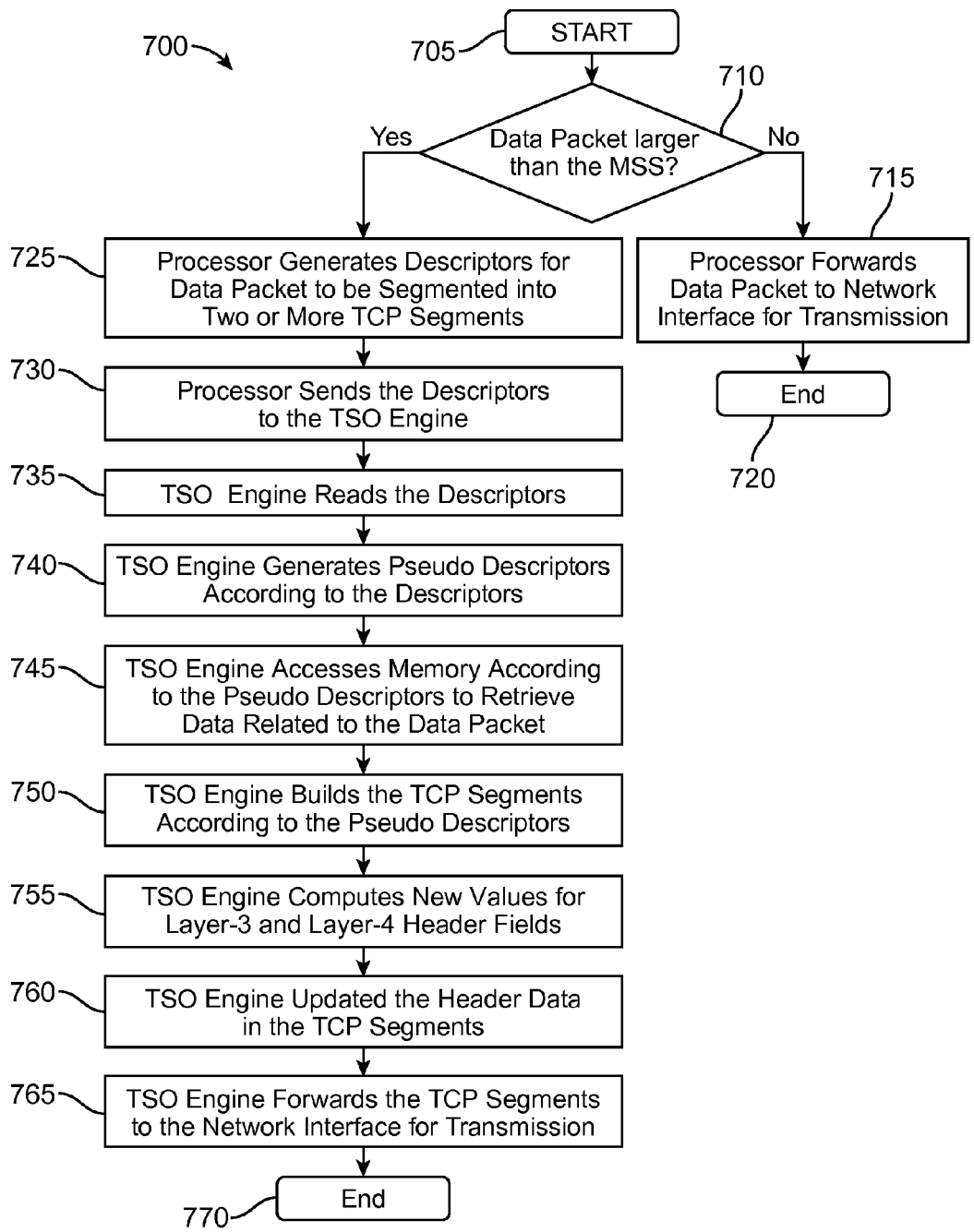

FIG. 7 shows a flow chart of the process depicted in FIGS. 6A, 6B, 6C, and 6D of segmenting an exemplary data packet into multiple TCP segments that is performed by the disclosed TSO engine, in accordance with at least one embodiment of the present disclosure.

DESCRIPTION

Some embodiments of the present disclosure will now be described in detail with respect to the drawings, which are provided as illustrative examples. Notably, the figures and examples below are not meant to limit the scope of the disclosure to a single embodiment, but other embodiments are possible by way of interchange of some or all of described or illustrated embodiments. Whenever convenient, the same reference numbers will be used throughout the drawings to refer to the same or like parts. Where certain elements of the embodiments can be partially or fully implemented using known components, only those portions of known components that are necessary for understanding of the embodiment will be described, and details descriptions of other portions of such known components will be omitted so as to not obscure the description. In the present specification, an embodiment showing a singular component should not be considered to be limiting; rather, other embodiments may include a plurality of the same components, and vice versa, unless explicitly stated otherwise. Moreover, applicants do not intend to for any term in the specification or claims to be ascribed an uncommon or special meaning unless explicitly set forth as such. Further, embodiments encompass present and future known equivalents to the components referred to by way of illustration.

In some embodiments, a hardware transmission control protocol (TCP) segmentation offload (TSO) engine is capable of handling segmentation of data packets and consequent header field mutation of hundreds of flows simultaneously. The TSO engine generates data pointers in order to "cut up" the payload data of a data packet, thereby creating multiple TCP segments. Once the data of the data packet has been fetched, the TSO engine "packs" the potentially-scattered chunks of data into TCP segments, and recalculates each TCP segment's internet protocol (IP) length, IP identification (ID), IP checksum, TCP sequence number, and TCP checksum, as well as modifies the TCP flags. The TSO engine is able to rapidly switch contexts, and share the control logic amongst all flows.

Figure 1:
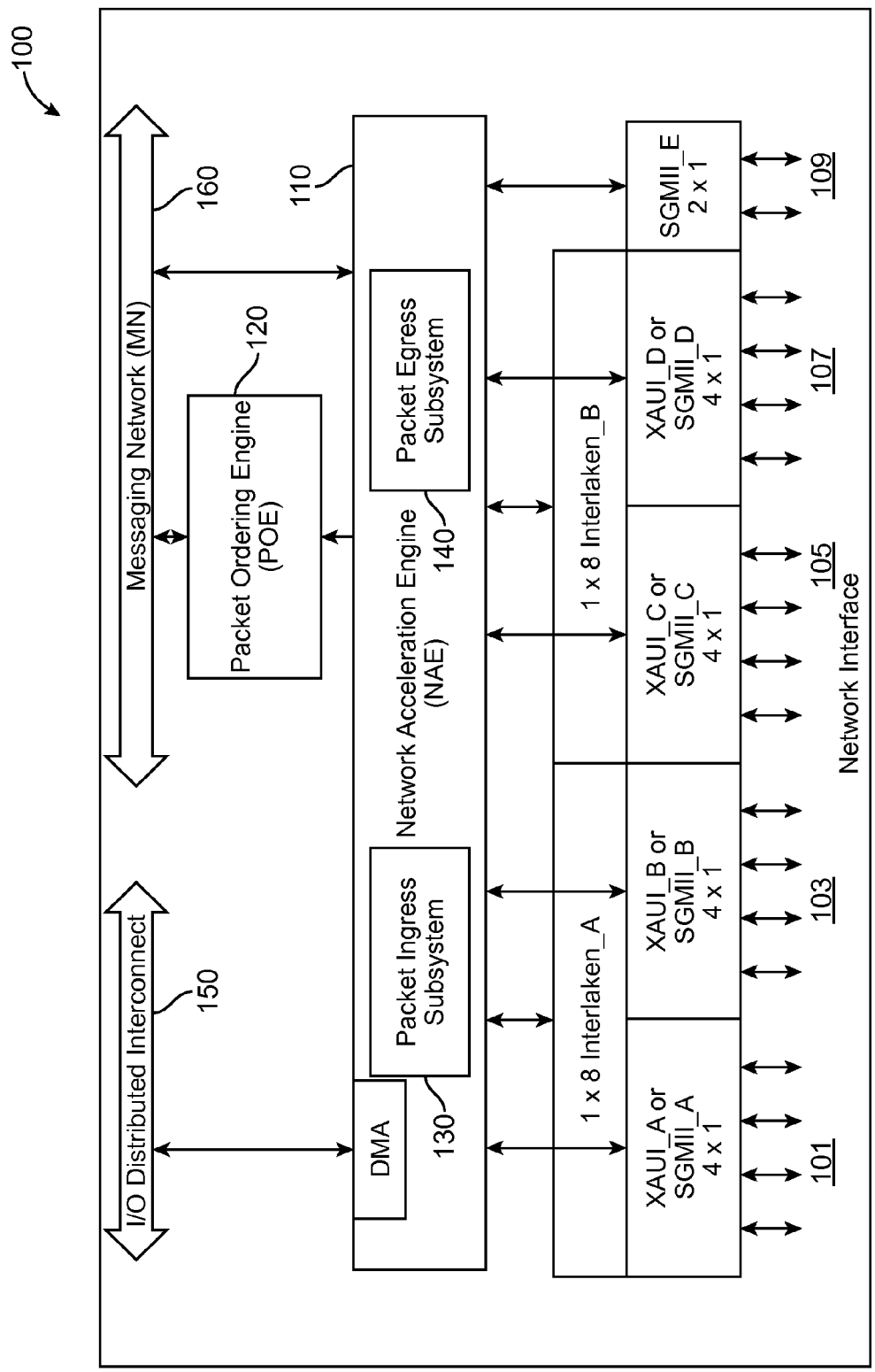
FIG. 1 is a diagram illustrating an exemplary system that employs the disclosed TCP segmentation offload (TSO) engine, in accordance with at least one embodiment of the present disclosure.

FIG. 1 is a diagram illustrating an exemplary system 100 that employs the TSO engine, in accordance with at least one embodiment of the present disclosure. The system 100 is part of a processor, and the I/O distributed interconnect 150 and the messaging network (MN) 160 are connected to memory (refer to item 170 in FIG. 2) and a plurality of processors (refer to item 180 in FIG. 2). In particular, this figure shows a network acceleration engine (NAE) 110 along with other related blocks. In this figure, all networking interfaces 101, 103, 105, 107, 109 are shown to be connected to the centralized NAE 110 for data packet parsing and classification. For this particular exemplary system 100, the NAE 110 is capable of handling an aggregate of 40 Gigabits per second (Gbps) of ingress traffic and 40 Gbps of egress traffic for data packets with sizes of 64 bytes or more.

A packet ordering engine (POE) 120 is responsible for ensuring that data packet fragments belonging to a specific flow are transmitted by the NAE Packet Egress Subsystem (NAE Tx) 140 in the same order in which they were received by the NAE Packet Ingress Subsystem (NAE Rx) 130. The main functions of the NAE Packet Ingress Subsystem 130 are to perform parsing and classification of incoming data packets received via interfaces 101-109 before passing control to the POE 120. The NAE Packet Ingress Subsystem 130 performs these functions, for example, using a dedicated hardware parser and up to sixteen (16) programmable micro-core processors. Other features of the NAE Packet Ingress Subsystem 130 include, but are not limited to, hardware-assisted protocol/transmission control protocol/user datagram protocol (IP/TCP/UDP) checksum validation, IEEE 1588v2 protocol timestamp support, pre-padding bytes (e.g., 64 bytes) to the received data packet for storing a classification key (e.g., 40-bytes in size) and timestamp, and class-based flow control to support selective lossless network connectivity.

In addition, the system 100 employs free descriptor queues (refer to item 320 in FIG. 2), which are in the NAE, that are divided into a number of descriptor pools (e.g., twenty (20) pools). Descriptors are message units of specially formatted words that are, for example, 64-bits in length. For the NAE 110, each descriptor points to a pre-allocated data buffer in memory where packet data will be stored. Software uses free-in messages to initialize the descriptors in the pools. The micro-core processors in the NAE Packet Ingress Subsystem 130 determine which descriptor pool to draw descriptors from for each data packet, thereby determining where each data packet will be written in memory.

The NAE Packet Egress Subsystem 140, as its name implies, is responsible for transmitting the data packets via interfaces 101-109. Other functions of the NAE Packet Egress Subsystem 140 include, but are not limited to, IP/TCP/UDP checksum generation and insertion, data packet assembly, TCP segmentation offloading (TSO) by use of an incorporated TSO engine, priority/deficit round robin-based packet scheduling for egress to the network interface, and time-stamping the transmitted data packet for IEEE 1588v2 protocol support.

Figure 2:
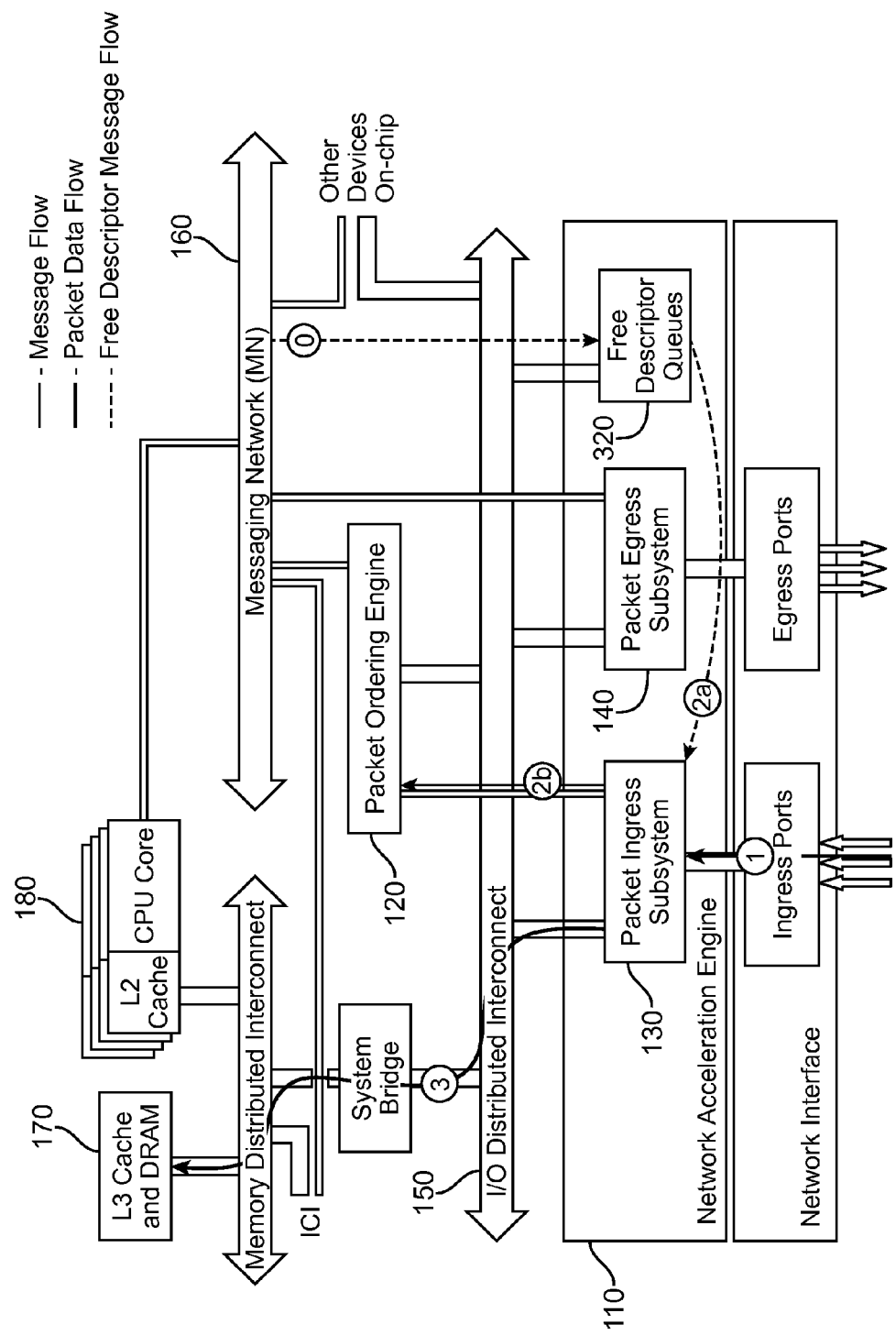
FIG. 2 is a diagram illustrating the ingress flow of a data packet though the exemplary system of FIG. 1, in accordance with at least one embodiment of the present disclosure.

FIG. 2 is a diagram illustrating the ingress flow of a data packet though the exemplary system 100 of FIG. 1, in accordance with at least one embodiment of the present disclosure. Before the NAE Packet Ingress Subsystem 130 is ready to perform its tasks, software allocates memory blocks that will be used for storing the packet data. The software also issues free-in messages (denoted by message flow 0 in FIG. 2) to populate the free descriptor queues 320 with free packet descriptors, which will point to memory blocks. The NAE Packet Ingress Subsystem 130 applies, for example, to two levels of data packet parsing (denoted by message flow 1 in FIG. 2). The first level of data packet parsing involves using a hardware parser to extract L2, L3, and L4 portions of the data packet header. The locations and sizes of the extracted header data are software configurable. In some embodiments, the hardware parser includes the ability to navigate virtual local area network (VLAN) stacks of internet protocol version 6 (IPv6) extension headers. The hardware parser uses the extracted portions of the header to generate a parser key designed to identify the packet profile. The second level of data packet parsing involves using programmable micro-core processors to extend the data packet parsing and classification capabilities. Also, optionally, packet data is modified by the micro-core processors before it is sent to memory.

After a first specific number of bytes (e.g., 448 bytes) of the data packet has been processed by the micro-core processors, the NAE Packet Ingress Subsystem 130 will fetch one or more data packet descriptors from a free descriptor queue 320 (denoted by message flow 2a in FIG. 2) to form receive (Rx) packet descriptors that point to where the packet data will be stored in memory. The NAE Packet Ingress Subsystem 130 bundles the packet descriptors into messages and passes them to the POE 120 (denoted by message flow 2b in FIG. 2) along with control signals that encode a flow identification (ID) (e.g., 16 bits in length), a distribution vector, a destination and forwarding mode (e.g., 12 bits in length). The messages and signals are used to decide how to enqueue or distribute the packet descriptors to their final destinations. Then, the received raw packet data along with pre-padded information will be direct memory accessed (DMA'd) to a L3 cache and dynamic-random access memory (DRAM) via input/output (I/O) distributed and memory distributed interconnects (denoted by message flow 3 in FIG. 2).

Figure 3:
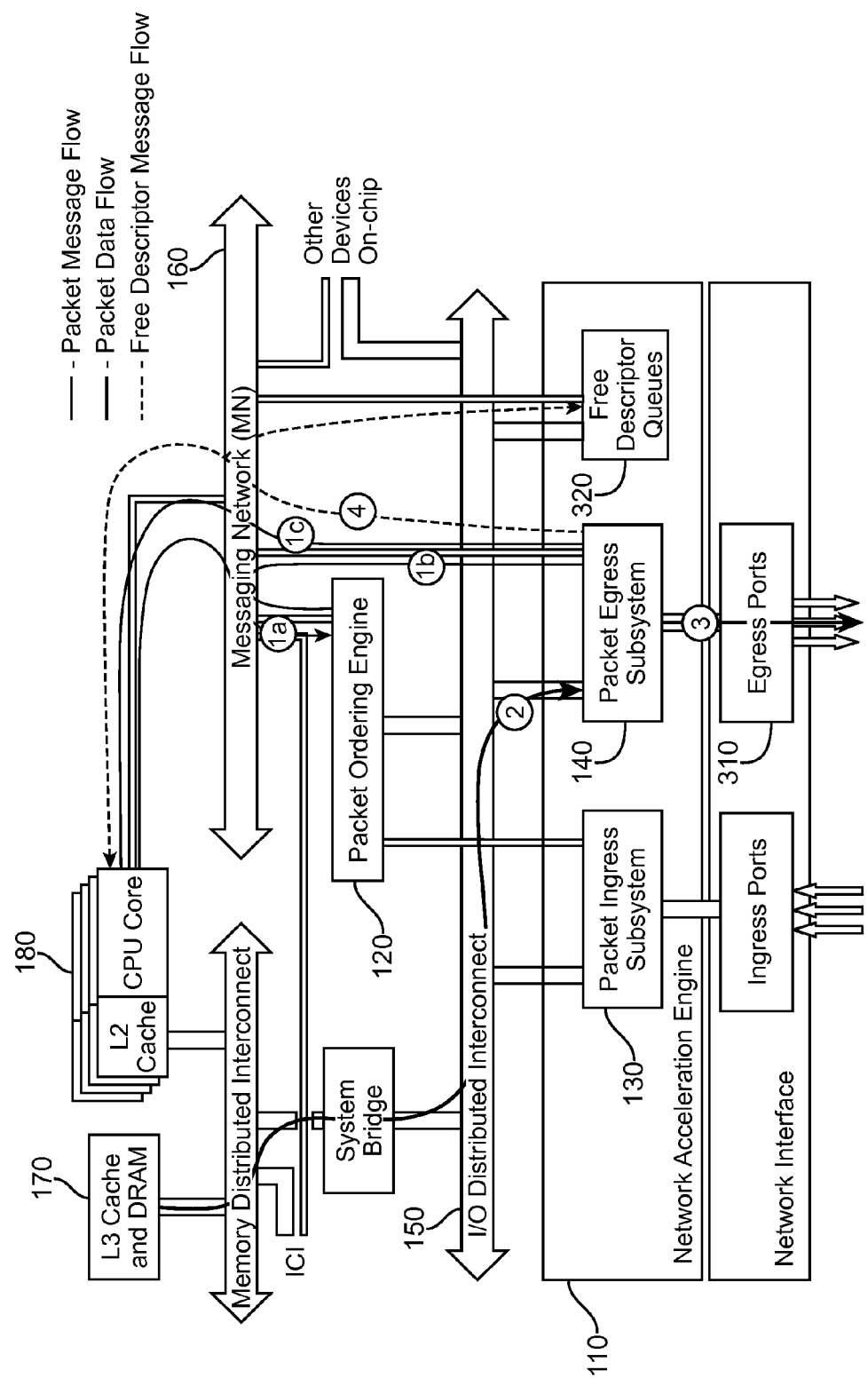
FIG. 3 is a diagram illustrating the egress flow of a data packet through the exemplary system of FIG. 1, in accordance with at least one embodiment of the present disclosure.

FIG. 3 is a diagram illustrating the egress flow of a data packet through the exemplary system 100 of FIG. 1, in accordance with at least one embodiment of the present disclosure. During normal processing, when packet descriptors are accompanied by POE descriptors, a processor thread, either real or virtual, in a central processing unit (CPU) core sends the packet descriptors back to the POE 120 (denoted by message flow 1a in FIG. 3). If the data packet is for transmission, the POE 120 will forward the packet descriptors to the NAE Packet Egress Subsystem 140 (denoted by message flow 1b in FIG. 3) in the same order they were received in the NAE Packet Ingress Subsystem 130. If no POE descriptor is associated with the packet descriptors, the processor thread sends the packet descriptors directly to the NAE 110 (denoted by message flow 1c in FIG. 3).

Then, the NAE 110 reads the data from packet buffers in a L3 cache/DRAM that is pointed to by the packet descriptors (denoted by message flow 2 in FIG. 3), and optionally calculates a IP/TCP/UDP checksum and/or a stream control transmission protocol (SCTP) checksum for the data. In addition, the NAE Packet Egress Subsystem 140 performs TCP segmentation offload (TSO) in hardware. The NAE Packet Egress Subsystem 140 transmits the packet data to the Network Interface Egress Ports 310 (e.g., corresponding to one or more of the interfaces 101-109, FIG. 1) for final transmission (denoted by message flow 3 in FIG. 3). Optionally, the data packet is time stamped for IEEE 1588v2 protocol support.

The Packet Egress Subsystem 140 frees up packet descriptors that are associated with data packets that have been transmitted to the free descriptor queues 320 (denoted by message flow 4 in FIG. 3). In addition, optionally, a notice regarding the free descriptors is sent to the processor thread. If the data packet transmission was initiated by the processor thread, packet descriptors can be freed up to the processor thread to free up the allocated memory.

Figure 4:
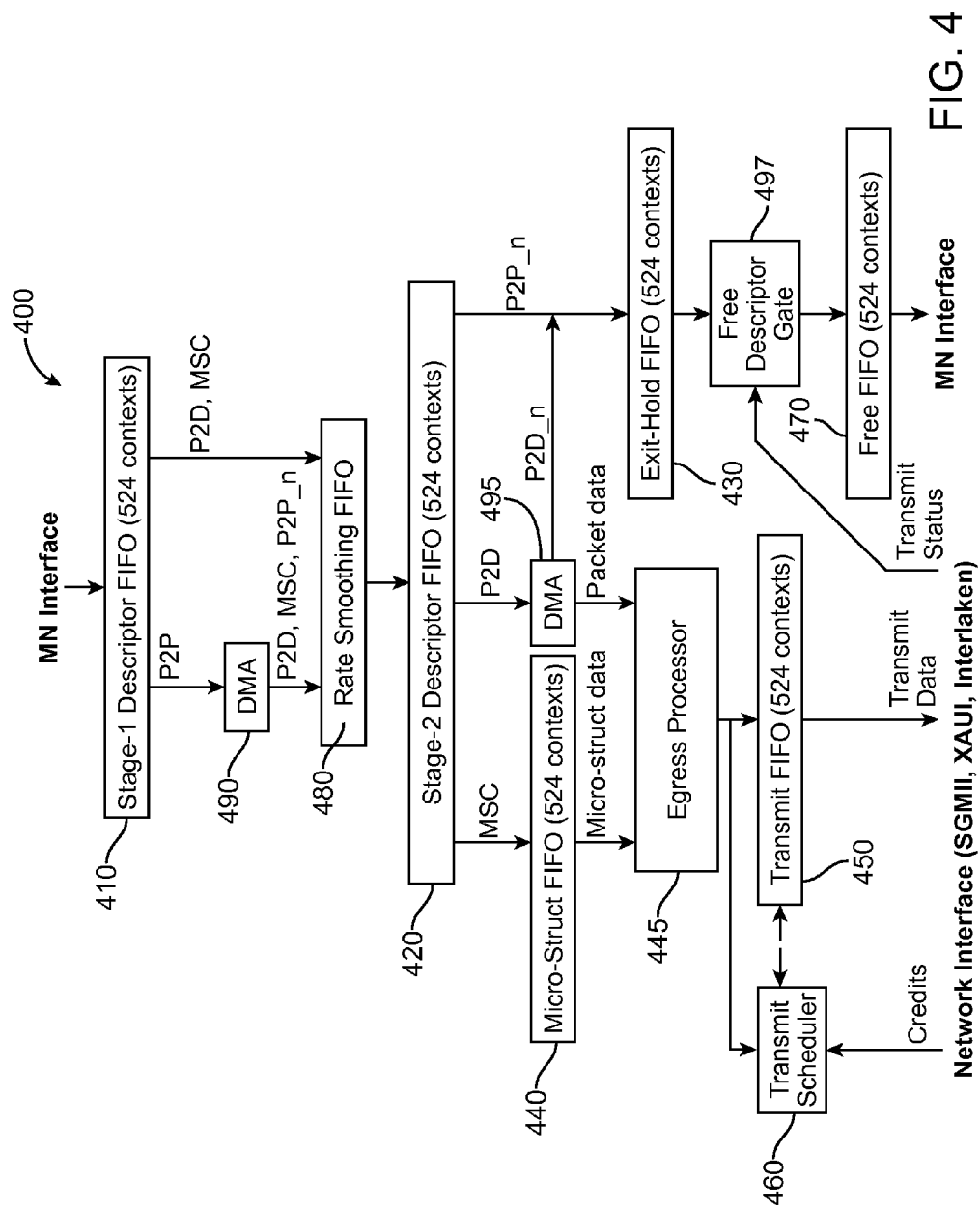
FIG. 4 is a functional block diagram of the egress path of the exemplary system of FIG. 1, in accordance with at least one embodiment of the present disclosure.

FIG. 4 is a functional block diagram 400 of the egress path of the exemplary system 100 of FIG. 1, in accordance with at least one embodiment of the present disclosure. The egress side of the NAE 110 receives packet descriptors that contain information about the data packets, processes the packet descriptors, and then reads the transmit data packets from memory according to the packet descriptors. In some embodiments, transmit (Tx) packet descriptors are broadly classified into three general types, which are (1.) a pointer-to-data descriptor (P2D), (2.) a pointer-to-list-of-pointers descriptor (P2P), and (3.) a micro struct control descriptor (MSC). A P2D descriptor points directly to packet data in memory, and a P2P descriptor contains a pointer to a list of P2D descriptors. An MSC descriptor is a command structure that instructs the Egress Processor 445 what operation to perform on the data packet that is associated with the next P2D descriptor. During normal operation, the POE 120 sends Tx packet descriptors to the NAE 110 using the messaging network (MN) (refer to 160 in FIG. 3), although it should be noted that a processor thread could also generate a Tx data packet. These Tx packet descriptors are stored in a message queue area, which allows for up to a specific number of contexts (e.g., 524 contexts).

The egress path of FIG. 4 contains a number of first-in-first-out units (FIFOs) 410, 420, 430, 440, 450, 470, 480 with associated logic; direct memory access (DMA) 490, 495 lookup logic; and an Egress Processor 445. The egress path receives the Tx packet descriptors from a processor thread via the messaging network. Then, the descriptors are fed into the Stage-1 Descriptor FIFO 410, which acknowledges the message by returning a message credit to the messaging network. Logic in the output stage of the Stage-1 Descriptor FIFO 410 directs P2P descriptors to a DMA engine 490. The DMA engine 490 in turn retrieves from memory, via the I/O distributed interconnect, the list of P2D descriptors and MSC descriptors that are pointed to by the P2P descriptor, and inserts these descriptors in the descriptor stream at the position of the P2P descriptor.

The Stage-2 Descriptor FIFO 420 directs the P2D descriptors to the DMA 495, which retrieves the associated packet data from memory and sends the packet data to the Egress Processor 445. The P2D and P2P descriptors are sent to the Exit Hold FIFO 430 where they will remain until the packet data has been transmitted out by the network interface. The output logic of the Stage-2 Descriptor FIFO 420 forwards MSC descriptors to the Micro-Struct FIFO 440. The Micro-Struct FIFO 440 holds the micro-struct, which contains up to two MSC descriptors, until the packet data associated with the packet descriptor following the MSC descriptor(s) is fed into the Egress Processor 445. The MSC descriptor(s) controls the operation to be performed on the data packet.

The processed data packet is then fed into a context-specific Transmit FIFO 450. In some embodiments, the scheduling of the data packets to each transmit network interface is performed by a 9-level strict priority scheduler 460, which is comprised, for example, of eight (8) strict-priority levels and one (1) deficit round-robin (DRR) level. After a data packet has been transmitted from the network interface, the network interface returns the transmit status, including an IEEE 1588v2 protocol time stamp indicating when the packet was transmitted if requested by the software. Upon receiving the transmit status signal, the associated P2D and P2P descriptors are released from the Exit Hold FIFO 430 and returned, via the Free Descriptor Gate 497 and the Free FIFO 470, to the Free Descriptor Queue 320 (refer to FIG. 2).

The NAE Packet Egress Subsystem (NAE Tx) (refer to 140 on FIG. 1) contains a hardware-implemented TCP segmentation offload (TSO) engine. The TSO engine can break large transmission control protocol/internet protocol (TCP/IP) data packets, which for example are up to 65,535 bytes in size, into TCP segments that are equal to or less than the maximum segment size (MSS). The MSS is the largest amount of payload data that can be encapsulated by a header of a TCP segment.

Figure 5:
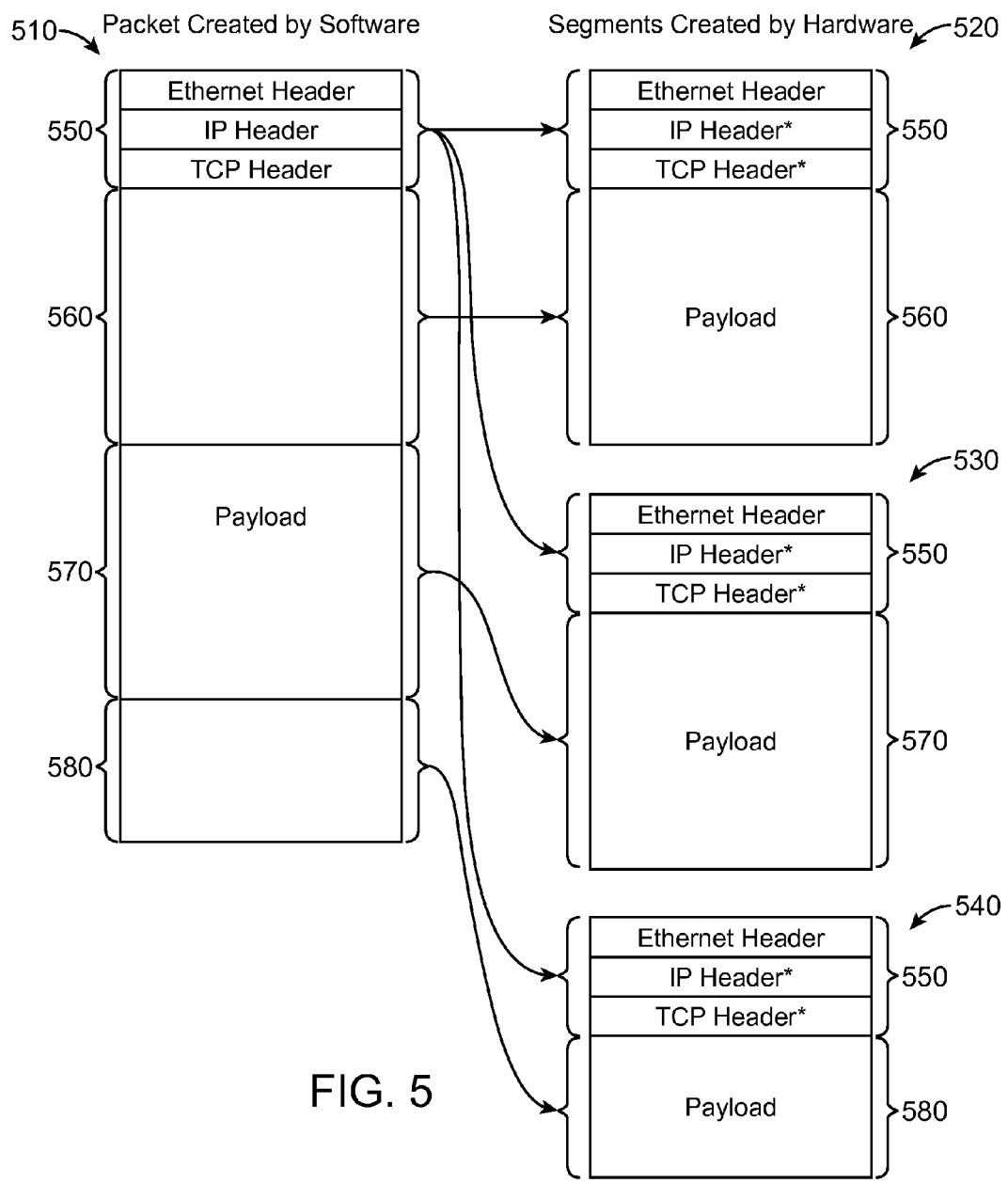
FIG. 5 illustrates an exemplary data packet that is segmented into three (3) TCP segments by the disclosed TSO engine, in accordance with at least one embodiment of the present disclosure.

FIG. 5 illustrates an exemplary data packet 510 that is segmented into three (3) TCP segments 520, 530, 540 by the disclosed TSO engine, in accordance with at least one embodiment of the present disclosure. In this figure, the original message data packet 510 is broken up by the hardware TSO engine into three TCP segments 520, 530, 540 for transmission. As is shown in this figure, TCP segments 520 and 530 are of the same size, which is the MSS, and TCP segment 540 is shown to be smaller in size than TCP segments 520 and 530. Associated with the original data packet 510 is control information that specifies what TSO operations are to be performed on the data packet.

During operation of the TSO engine, the processor thread passes data packets to the NAE Packet Egress Subsystem (NAE Tx) (refer to 140 on FIG. 1). For each data packet, the processor thread generates and sends one or more message descriptors over the messaging network (refer to 160 in FIG. 1). A descriptor either points to a contiguous block of data in memory or contains control information pertaining to an operation, such as a TSO operation, to be performed by the Egress Processor (refer to 445 on FIG. 4) on the corresponding data. Four types of descriptors are used, these are: (1.) a pointer-to-data descriptor (P2D), (2.) a pointer-to-data end-of-packet (EOP) descriptor (P2DE), (3.) a micro-struct (MSC) descriptor, and (4.) a pointer-to-list-of-pointers descriptor (P2P).

A P2D descriptor points to a contiguous block of data in the memory, which can be, for example, up to 16 kilobytes (KB) in size (or more). P2D descriptors contain the physical address memory location from which packet data will be read. The physical address does not have to be aligned on a cache line boundary. The P2D descriptors also contain the length of the packet data in bytes. In some embodiments, a maximum of four descriptors is used for a single message. Therefore, very large data packets use a P2P descriptor for multiple messages with P2D descriptors to reference the complete data packet. A P2DE descriptor is a P2D descriptor where the last byte of the contiguous block of data is also the last byte of the data packet.

A MSC descriptor is a control descriptor that precedes the P2D descriptor(s) of a data packet on which TCP segmentation and/or other TSO operation(s) are to be performed. Types of TSO operations to be performed include, but are not limited to, calculating an internet protocol (IP) length, an IP identification (ID), an IP checksum, a TCP sequence number, and a TCP checksum. The MSC descriptor contains parameters that relate to the TSO operation(s) that is to be performed on the data packet. Unlike the P2D and P2DE descriptors, a MSC descriptor does not point to data. A P2P descriptor points to a block of data in memory that contains at least one descriptor of type MSC, P2D, or P2DE.

When the processor thread needs to pass a data packet to the NAE Packet Egress Subsystem (NAE Tx) (refer to 140 on FIG. 1) on which TCP segmentation is to be performed, the processor thread sends an MSC descriptor. The MSC descriptor is followed (e.g., immediately followed) by zero or more P2D descriptors, which are then followed by a single P2DE descriptor. As such, the sequence of descriptors sent by the processor thread is as follows: MSC, P2D0, P2D1, . . . , P2DN, P2DE. In some embodiments, for this sequence, only the MSC descriptor and the P2DE descriptor are mandatory. The P2D and P2DE descriptors collectively reference the entire data packet's contents, which include the header data and the payload data. Alternatively, the processor thread can write the above listed sequence of descriptors to memory, and send to the NAE Packet Egress Subsystem (NAE Tx) a single P2P descriptor pointing to the list of descriptors.

The NAE Packet Egress Subsystem (NAE Tx) accomplishes TCP segmentation by "breaking" the sequence of descriptors received from the processor thread into pseudo descriptors. Each pseudo descriptor includes a single header pseudo descriptor (DH) and one or more payload pseudo descriptors (DP). The DH is used to insert the header (which includes an Ethernet header, an IP header, and a TCP header) at the beginning of each TCP segment. Each DP points to a block of data equal in size to the MSS. It should be noted that the last DP may point to a block of data that is smaller in size than the MSS.

Once the pseudo descriptors have been created, the TSO engine uses the DH to fetch the header data 550 through DMA. Then, the TSO engine uses the first DP to fetch the payload data 560 though DMA. The TSO engine then uses the DH to fetch the header data 550 again, and uses the second DP to fetch the payload data 570. Then, the TSO engine uses the DH to fetch the header data 550 again, and uses the third DP to fetch the payload data 580. The DH's and DP's are packed together to form TCP data segments 520, 530, 540 that are to be sent to the network interface for transmission. The header field (e.g., sequence number and acknowledgement (ACK) bit) for each of the TCP data segments is appropriately set for each outgoing TCP segment.

Because the TSO engine saves a header DH and uses it for fetching the header from memory multiple times (e.g., once for each TCP segment), the three header components (an Ethernet header, an IP header, and a TCP header) are be stored in a contiguous block of memory, and are pointed to by a single descriptor, in accordance with some embodiments. If these header components are scattered at non-contiguous addresses in memory, software sends to the NAE Packet Egress Subsystem (NAE Tx) a stream of descriptors (e.g., P2D, P2DE, and P2P) that describe an already-segmented data packet. In such cases, the NAE Packet Egress Subsystem (NAE Tx) will fetch the scattered blocks of data, pack them to form TCP data segments, and send them to the network interface. For this system, in some embodiments, no more than four descriptors are used for a single message, including the POE descriptor. Thus, very large data packets use a P2P type of descriptor or multiple messages with P2D descriptors to reference the complete data packet.

FIGS. 6A, 6B, 6C, and 6D, when viewed together, illustrate the process of segmenting an exemplary data packet into multiple TCP segments that is performed by the disclosed TSO engine, in accordance with at least one embodiment of the present disclosure. Specifically, FIG. 6A shows sections of the exemplary data packet being stored in memory, in accordance with at least one embodiment of the present disclosure. In this figure, the message information 610 of the exemplary data packet is shown to have a header length of 70 bytes and a total length of 2500 bytes. For this example, the MSS is equal to 930 bytes. As is shown in this figure, the packet is broken into two parts, which are stored at two different non-contiguous locations in memory (i.e. addresses A0 and A1). Since this data packet has a total length of 2500 bytes and the MSS is only 930 bytes, if this data packet is to be transmitted, it will be segmented into TCP segments that have payloads of a size equal to or less than the MSS of 930 bytes.

Once it is determined that the data packet is to be transmitted and is to be segmented into multiple TCP segments for transmission, a processor generates a series of descriptors that are related to the segmentation of the data packet. FIG. 6B shows the descriptors 620 for the exemplary data packet that are generated by a processor. In this figure, the descriptors 620 include two MSC descriptors, one P2D descriptor, and one P2DE descriptor. The P2D descriptor (P2D0) indicates that the first part of the packet data is stored in memory starting at address location A0 and has a length of 500 bytes. And, the P2DE descriptor (P2DE) indicates that the second part of the packet data is stored in memory starting at address location A1 and has a length of 2000 bytes. Also, the P2DE descriptor, being an end-of-packet descriptor, indicates that the second part of the data packet is the final part of the data packet.

After the processor generates the series of descriptors 620, the processor sends the descriptors 620 to the TSO engine. After the TSO engine receives the descriptors 620, the TSO engine reads the descriptors 620. The TSO engine then generates a series of pseudo descriptors according to the descriptors 620 that it received from the processor. FIG. 6C shows the pseudo descriptors 630 that are generated by the TSO engine and are used to build the TCP segments. In this figure, it is shown that the TSO engine has broken the series of descriptors 620 that it received into three data sets containing pseudo descriptors 630.

The first data set contains pseudo descriptors DH+DP and DP0. The DH+DP pseudo descriptor indicates that the header data as well as a portion of the payload data for the first data set is stored in memory starting at address location A0 and has a length of 500 bytes. The DP0 pseudo descriptor indicates that at least a portion of the payload data for the first data set is stored in memory starting at address location A1 and has a length of 500 bytes.

The second data set contains pseudo descriptors DH and DP1. The DH pseudo descriptor indicates that the header data for the second data set is stored in memory starting at address location A0 and has a length of 70 bytes. The DP1 pseudo descriptor indicates that the payload data for the second data set is stored in memory starting at address location A1+500 and has a length of 930 bytes.

The third data set contains pseudo descriptors DH and DP2. The DH pseudo descriptor indicates that the header data for the third data set is stored in memory starting at address location A0 and has a length of 70 bytes. The DP2 pseudo descriptor indicates that the payload data for the third data set is stored in memory starting at address location A1+1430 and has a length of 570 bytes.

After the TSO engine has generated the series of pseudo descriptors 630, the TSO engine accesses memory at the locations specified by the pseudo descriptors 630 to retrieve the data that is related to the data packet and builds TCP segments according to the pseudo descriptors 630, using the retrieved data. FIG. 6D shows the TCP segments 640 that are built by the TSO engine according to the pseudo descriptors 630. In this figure, the first TCP segment (TCP0) is built from the data from the first set of data. The first TCP segment is shown to have 70 bytes of header data and 930 bytes of payload data. The second TCP segment (TCP1) is built from data from the second set of data. In this figure, the second TCP segment is shown to have 70 bytes of header data and 930 bytes of payload data. And, the third TCP segment (TCP2) is built from data from the third set of data. The third TCP segment is shown to have 70 bytes of header data and 570 bytes of payload data.

After the TSO engine has built the TCP segments, the TSO engine performs on the packet data the TSO operations that were specified by the two MSC descriptors, which specify to recompute the values of certain fields in the header. After the TSO engine has performed the TSO operations by recomputing the values of certain fields in the Layer-3 and Layer-4 headers, the TSO engine updates the header data in the TCP segments accordingly. Once the header data in the TCP segments has been updated, the TCP segments are ready for transmission. Since the payload of each of the three TCP segments (TCP0, TCP1, and TCP2) are of a size equal to or less than the MSS of 930 bytes, all three TCP segments are able to be transmitted. After the TSO engine has built the TCP segments and updated the header data of the TCP segments, the TCP segments are sent to the network interface for transmission.

FIG. 7 shows a flow chart 700 of the process depicted in FIGS. 6A, 6B, 6C, and 6D of segmenting an exemplary data packet into multiple TCP segments that is performed by the disclosed TSO engine, in accordance with at least one embodiment of the present disclosure. At the start 705 of the process flow 700, the processor determines whether the payload of the data packet for transmission is larger in size than the MSS 710. If the processor determines that the payload of the data packet is equal to or smaller in size than the MSS, the processor will forward the data packet to the network interface for transmission 715. After the processor has forwarded the data packet to the network interface, the process ends 720.

However, if the processor determines that the data packet is larger in size than the MSS, the processor will generate descriptors (e.g., as shown in FIG. 6B) for the data packet to be segmented into two or more segments 725. The descriptors include, for example, two MSC descriptors, one P2DE descriptor, and optionally one or more P2D descriptors. After the processor has generated the descriptors, the processor will send the descriptors to the TSO engine 730. After the processor has sent the descriptors to the TSO engine, the TSO engine will generate pseudo descriptors (e.g., as shown in FIG. 6C) according to the descriptors that it has received 740. After the TSO engine has generated the pseudo descriptors, the TSO engine will access memory, according to the pseudo descriptors, to retrieve data related to the data packet 745.

Once the TSO engine has retrieved the data from memory, the TSO engine will build the TCP segments according to the pseudo descriptors 750 (e.g., as shown in FIG. 6D). After the TCP segments are built, the TSO engine will perform any TSO operations by recomputing new values for the Layer-3 and Layer-4 header fields, which were specified by the MSC descriptors 755. After the TSO engine has performed the TSO operations, the TSO engine will update the header data in the TCP segments accordingly 760. After the header data of the TCP segments has been updated, the TCP segments are now ready for transmission. As such, the TSO engine will then forward the TCP segments to the network interface for transmission 765. After the TCP segments have been forwarded to the network interface, the process ends 770.

Accordingly, embodiments may be realized in hardware, software, or a combination of hardware and software. Embodiments may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in and/or controlled by a computer program product that includes instructions stored on a non-transitory computer-readable storage medium and that comprises all the features enabling the implementation of the methods described herein, and which when loaded in and executed by a particular computer system is able to carry out these methods. Computer program in the present context means any expression, in any language, code or notation, of a set of instructions intended to cause a system having an information processing capability to perform a particular function either directly or after either or both of the following: 1.) conversion to another language, code or notation; 2.) reproduction in a different material form.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of embodiments differ in matters of detail only. Accordingly, it is intended that the embodiments disclosed shall be limited only to the extent required by the appended claims and the rules and principles of applicable law.

We claim:

1. A method for transmission control protocol (TCP) segmentation offload (TSO), the method comprising:
generating descriptors for a data packet to be segmented into two or more TCP segments;
generating pseudo descriptors according to the descriptors;
accessing memory according to the pseudo descriptors to retrieve data related to the data packet; and building the TCP segments according to the pseudo descriptors,
wherein the descriptors comprise a first descriptor that points to data and a second descriptor that describes an operation to perform on the data pointed to by the first descriptor.

2. The method for TSO of claim 1, wherein the method further comprises sending the descriptors to a TSO engine, which is configured to perform the generating pseudo descriptors according to the descriptors, the accessing memory according to the pseudo descriptors to retrieve data related to the data packet, and the building the TCP segments according to the pseudo descriptors.

3. The method for TSO of claim 1, wherein the second descriptor is a micro-struct descriptor.

4. The method for TSO of claim 3, wherein the micro-struct descriptor includes parameters relating to calculating for at least one of the TCP segments at least one of an internet protocol (IP) length, an IP identification (ID), an IP checksum, a TCP sequence number, or a TCP checksum.

5. The method for TSO of claim 1, wherein the first descriptor is a pointer-to-data descriptor that points to a contiguous block of data in the memory.

6. The method for TSO of claim 5, wherein the pointer-to-data descriptor includes an address relating to the contiguous block of data and a length relating to the contiguous block of data.

7. The method for TSO of claim 1, wherein the descriptors further comprise a third descriptor that is a pointer-to-data end-of-packet (EOP) descriptor that points to a contiguous block of data in the memory, wherein a last byte of the contiguous block of data is also a last byte of the data packet.

8. The method for TSO of claim 7, wherein the pointer-to-data EOP descriptor includes an address relating to the contiguous block of data and a length relating to the contiguous block of data.

9. The method for TSO of claim 1, wherein at least one pseudo descriptor is a header pseudo-descriptor (DH) that relates to a header of each of the TCP segments.

10. The method for TSO of claim 9, wherein the DH includes an address relating to a contiguous block of data and a length relating to the contiguous block of data.

11. The method for TSO of claim 1, wherein at least one pseudo descriptor is a payload pseudo-descriptor (DP) that relates to at least a portion of payload data of at least one of the TCP segments.

12. The method for TSO of claim 11, wherein the DP includes an address relating to a contiguous block of data and a length relating to the contiguous block of data.

13. The method for TSO of claim 1, wherein payload data of each of the TCP segments is one of a size equal to a maximum segment size (MSS) and a size less than the MSS.

14. The method for TSO of claim 13, wherein the MSS corresponds to the largest amount of the payload data that can be encapsulated by a header of one of the TCP segments.

15. The method for TSO of claim 1, wherein the TSO engine is implemented by hardware.

16. The method for TSO of claim 1, further comprising: forwarding the descriptors to one or more free descriptor queues.

17. The method for TSO of claim 1, wherein the descriptors further comprise a third descriptor that is a pointer-to-list-of-pointers descriptor.

18. A system for transmission control protocol (TCP) segmentation offload (TSO), the system comprising:
a processor configured to generate descriptors for a data packet to be segmented into two or more TCP segments; and
a TSO engine configured to read the descriptors, generate pseudo descriptors according to the descriptors, access memory according to the pseudo descriptors to retrieve data related to the data packet, and build the TCP segments according to the pseudo descriptors,
wherein the descriptors comprise a first descriptor that points to data and a second descriptor that describes an operation to perform on the data pointed to by the first descriptor.

19. The system for TSO of claim 18, wherein the second descriptor is a micro-struct descriptor.

20. The system for TSO of claim 19, wherein the micro-struct descriptor includes parameters relating to calculating for at least one of the TCP segments at least one of an internet protocol (IP) length, an Identification (ID), an IP checksum, a TCP sequence number, and a TCP checksum.

21. The system for TSO of claim 18, wherein the first descriptor is a pointer-to-data descriptor that points to a contiguous block of data in the memory.

22. The system for TSO of claim 21, wherein the pointer-to-data descriptor includes an address relating to the contiguous block of data and a length relating to the contiguous block of data.

23. The system for TSO of claim 18, wherein the descriptors further comprise a third descriptor that is a pointer-to-data end-of-packet (EOP) descriptor that points to a contiguous block of data in the memory, wherein a last byte of the contiguous block of data is also a last byte of the data packet.

24. The system for TSO of claim 23, wherein the pointer-to-data EOP descriptor includes an address relating to the contiguous block of data and a length relating to the contiguous block of data.

25. The system for TSO of claim 18, wherein at least one pseudo descriptor is a header pseudo-descriptor (DH) that relates to a header of at least one of the TCP segments.

26. The system for TSO of claim 25, wherein the DH includes an address relating to the contiguous block of data and a length relating to the contiguous block of data.

27. The system for TSO of claim 18, wherein at least one pseudo descriptor is a payload pseudo-descriptor (DP) that relates to at least a portion of payload data of at least one of the TCP segments.

28. The system for TSO of claim 27, wherein the DP includes an address relating to a contiguous block of data and a length relating to the contiguous block of data.

29. The system for TSO of claim 18, wherein payload data of each of the TCP segments is one of a size equal to a maximum segment size (MSS) and a size less than the MSS.

30. The system for TSO of claim 29, wherein the MSS corresponds to the largest amount of the payload data that can be encapsulated by a header of one of the TCP segments.

31. The system for TSO of claim 18, wherein the TSO engine is implemented by hardware.

32. The system for TSO of claim 18, further comprising:
one or more free descriptor queues, wherein the TSO engine is further configured to forward the descriptors to the one or more free descriptor queues.

33. The system for TSO of claim 18, wherein the descriptors further comprise a third descriptor that is a pointer-to-list-of-pointers descriptor.

34. A system comprising:
a free descriptor queue configured to store free descriptors;
a packet egress subsystem configured to receive a transmit packet descriptor, generate a pseudo descriptor based on the transmit packet descriptor, generate a TCP segment based on the pseudo descriptor, and forward the transmit packet descriptor to the free descriptor queue; and a packet ingress subsystem configured to process an incoming data packet, fetch a free descriptor from the free descriptor queue, and generate a receive packet descriptor that indicates a location in memory of data related to the incoming data packet.

35. The system of claim 34, further comprising:
a packet ordering engine communicatively coupled to the packet egress subsystem, and configured to forward the transmit packet descriptor to the packet egress subsystem.

36. The system of claim 34, wherein the packet egress subsystem comprises a TCP segmentation offload engine configured to generate the TCP segment.

37. The system of claim 34, wherein the packet ingress subsystem comprises a parser configured to parse the incoming data packet.

38. The system of claim 34, wherein the packet ingress subsystem is further configured to forward the received packet descriptor to a packet ordering engine.

39. The system of claim 34, further comprising:
an ingress port, communicatively coupled to the packet ingress subsystem, and configured to receive an incoming data packet; and
an egress port, communicatively coupled to the packet egress subsystem, and configured to transmit an outgoing data packet that includes the TCP segment.

40. The system of claim 34, further comprising:
a memory system, communicatively coupled to the packet egress subsystem, and configured to store data used to generate the TCP segment.

41. The system of claim 34, wherein the free descriptor queue is configured to store descriptors that are available for use by the packet ingress subsystem.

* * * * *